US00RE41952E

(19) United States
(12) Reissued Patent
McCoy

(10) Patent Number: US RE41,952 E
(45) Date of Reissued Patent: Nov. 23, 2010

(54) MULTIPLE SUB-CHANNEL MODULATION AND DEMODULATION WITH ARBITRARILY DEFINED CHANNEL SPACING AND SAMPLING RATES

(76) Inventor: James Wesley McCoy, 10 Overhill Dr., Trophy Club, TX (US) 76262

(21) Appl. No.: 12/027,401

(22) Filed: Feb. 7, 2008

(Under 37 CFR 1.47)

Related U.S. Patent Documents

Reissue of:

(64) Patent No.: 6,996,188
Issued: Feb. 7, 2006
Appl. No.: 09/888,684
Filed: Jun. 25, 2001

(51) Int. Cl.
*H04K 1/10* (2006.01)
*H04L 27/28* (2006.01)

(52) U.S. Cl. ..... 375/260; 375/355; 375/362

(58) Field of Classification Search ..... 375/260, 375/316, 224, 228; 455/315
See application file for complete search history.

(56) References Cited

U.S. PATENT DOCUMENTS 5,323,391 A 6/1994 Harrison
5,396,489 A 3/1995 Harrison
6,005,900 A 12/1999 Zangi
6,134,268 A 10/2000 McCoy
6,496,546 B1 12/2002 Allpress et al.
2002/0176509 A1 11/2002 Gatherer et al.

*Primary Examiner*—Chieh M Fan
*Assistant Examiner*—Qutbuddin Ghulamali
(74) *Attorney, Agent, or Firm*—Connolly Bove Lodge & Hutz LLP

(57) ABSTRACT

A modulator, and demodulator, apparatus and method for use in a multiple sub-channel communication system is taught. A commutator is employed for fractionally sampling, or distributing, signals from, or to, a multiple channel polyphase filter. The filter is coupled with a discrete Fourier transform, or its inverse, such that the relationship between the base-band sampling rate of a plurality of sub-channel signals, the frequency spacing of the sub-channel signals, and the sampling rate of a composite signal can be related by any rational number, thereby freeing designers to optimize system design respecting channel spacing, bandwidth, and signaling rates. The advantages of the present invention are realized by adjusting the interpolation and decimation rates of the filter, and by adjusting the resolution and decimation rates of the transform.

25 Claims, 6 Drawing Sheets

MULTIPLE SUB-CHANNEL MODULATION AND DEMODULATION WITH ARBITRARILY DEFINED CHANNEL SPACING AND SAMPLING RATES

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates in general to digital communication signal processing techniques, and more specifically to modulation and demodulation techniques in multiple sub-channel communications systems.

2. Description of the Related Art

Multiple sub-channel modulation and demodulation engines, and corresponding transmitters and receivers, which are implemented with digital signaling techniques are known in the art. One application of such a device is to communicate several sub-channels of information within a single, broader bandwidth, channel. Such systems employ orthogonal frequency division multiplexed ("OFDM") modulation, multi-carrier transmission ("MCT") modulation, and others modulation techniques. The general modulation approach in such systems is to consolidate the multiple sub-channels as sub-carriers in a composite signal in the base-band, and then frequency-shift the consolidated signal to the allocated carrier signal band, usually centered about a carrier frequency. Although, it is also understood that such systems can operate in the base-band without frequency shifting, and that such systems can be utilized in other electromagnetic bands, such as infrared and visible light. Multiple sub-channel modulation and demodulation devices employ various topologies and architectures. Among these are a particular variety that employ a combination of inverse Fourier transforms (or Fourier transforms) with polyphase filters and a software commutator. This is typically accomplished within a digital signal processor, however software implementations in other kinds of computing devices are certainly available. The basic design parameters of such devices, that are used for the purpose of modulation, are characterized by a number of input sub-channel signals, or sub-carrier signals, that are sampled at an input, or base-band, sampling rate, and, that are spaced apart in frequency by an input frequency spacing that is ultimately translated through to a composite signal. In addition, such devices are characterized by the composite output signal that is sampled according to an output, or composite, sampling rate. Respecting demodulation, the same characteristics apply, but are related to the input sampling rate of a composite signal, and the output sampling rate and frequency spacing of plural output sub-channel signals. These characterizations of are of vital importance when considering an overall system design and architecture.

The design of a polyphase filter for band limiting each sub-channel according to its pass-band and frequency spacing is critical to the design of an efficient data communications system. So too is the communications baud rate, which is directly affected by the filter design and sub-channel spacing, and which is important to the spectral response of the composite signal transmitted in the allocated channel. Previously, those skilled in the art have understood that there were various constraints placed on the relationship between the input sampling rate, the sub-channel frequency spacing, and the output sampling rate. These constraints have been considered problematic respecting optimum system design, especially where maximum performance in marginal signal conditions were sought.

More particularly, polyphase filters operate by multiplying selected phases, or samples, of a filter impulse response with samples of one or more the aforementioned input signals. Prior-art multiple channel polyphase filters have synchronized the selected phases of the filter impulse response with the positions of a commutator of the filter. In prior-art multiple channel polyphase filters, a given position of the commutator has corresponded uniquely to a predetermined phase of the filter impulse response. Those of ordinary skill in the art of polyphase filter design have even accepted that in multiple sub-channel polyphase modulators, the sub-channel sampling rate must be an integral multiple of the input sample rate, which also implies that the channel bandwidth, or frequency spacing, must be an integer multiple of the input sample rate.

The tight limitations on the relationship between input sampling rate, frequency spacing, and output sampling rate were partially alleviated by the teachings of the present inventor, McCoy, in a prior U.S. Pat. No. 6,134,268 to McCoy for APPARATUS FOR PERFORMING A NON-INTEGER SAMPLING RATE CHANGE IN A MULTIPLE CHANNEL POLYPHASE FILTER (the '268 patent), the contents of which are hereby incorporated by reference thereto. The '268 patent teaches a multiple channel polyphase filter that includes a processing system for accepting and processing 'M' input channels of data, each sampled at an input sampling rate, wherein 'M' is a positive integer. The processing system is programmed to provide a commutator for the multiple channel polyphase filter, wherein the position of the commutator is decoupled from the phase of a filter impulse response selected for the position, thereby allowing the multiple channel polyphase filter to be operated at a sampling rate that is a non-integer multiple of the input sampling rate. The processing system is further programmed to operate the multiple channel polyphase filter at the non-integer multiple of the input sampling rate to obtain a non-integer sampling rate change. Other embodiments and applications taught by the '268 patent include a multiple channel polyphase filter, a multiple channel modulation engine, a corresponding multiple channel demodulation engine, a multiple channel transmitter, and a corresponding multiple channel receiver. While all of these embodiments teach the decoupling of the input sampling rate from the output sampling rate, each still suffers from a limitation defining the sub-channel frequency spacing by a fixed relationship between the input sampling rate and output sampling rate. Thus, even in view of the teachings of McCoy in the '268 patent, communication system designers are faced with a constraints on sub-channel spacing that is often times unable to deliver optimum performance in practical applications.

Thus, there is a need in the art for a modulation and demodulation engine applicable to multiple sub-channel systems that allows for the arbitrary specification of sub-channel frequency spacing with respect to input and output sample rates.

SUMMARY OF THE INVENTION

The need in the art is addressed by the apparatus and methods of the present invention. The present invention encompasses multiple channel modulation bank that includes a programmable processing system for accepting plural channels of input data at an arbitrary sampling rate, or baud, rate, forming a composite output signal at an arbitrary sampling rate. Also, a multiple channel demodulation bank that includes a programmable processing system for accepting a composite input signal at an arbitrary sampling rate and yielding plural channels of output data at an arbitrary sampling rate. The sub-channels of data are spaced at an arbitrary spacing. While the prior art has restricted the relationship between the input sampling rate, output sampling rate, and the frequency spacing in some way, the present invention allows any rational relationship between all of these.

In particular, a modulator for receiving plural sub-channel signals that are sampled at a base-band sampling frequency and separated by a frequency spacing, and, for generating a composite signal, combining the plurality of sub-channel signals, that is sampled at a composite sampling frequency is taught. The modulator includes an inverse discrete Fourier transform coupled to receive the plural sub-channel signals and transform them into plural time domain signals. It also includes a multiple channel polyphase filter that receives the plural time domain signals and outputs a plurality of filter signals to a commutator. The commutator fractionally samples the filter signals at a rate defined by the ratio of the frequency spacing and a greatest common denominator between the composite sampling rate and the frequency spacing.

In a refinement of the foregoing modulator, the commutator fractional sampling ratio is derived as a ratio of integers thus allowing the relationship to be expressed as any rational number. In a further refinement, the modulator further adds a wireless modulator that mixes the composite signal with a wireless carrier for use in wireless transmission. In a further refinement, the transform, the filter, and the commutator are implemented with executable software on a processor. In a further refinement, the processor is a digital signal processor.

The present invention also teaches a modulator for receiving plural sub-channel signals that are sampled at a base-band sampling frequency and separated by a frequency spacing, and, for generating a composite signal, combining the plural sub-channel signals, that is sampled at a composite sampling frequency. The modulator includes an inverse discrete Fourier transform that transforms the plural sub-channel signals into plural time domain signals. The transform resolution is defined by the ratio of the composite sampling frequency and the greatest common divisor between the composite sampling frequency and the frequency spacing. Also, the transform decimation rate is defined by the ratio of the frequency spacing and a greatest common divisor between the composite sampling frequency and the frequency spacing. The modulator also includes a multiple channel polyphase filter that receives the plural time domain signals and outputs plural filter signals. The filter has an interpolation rate defined by a least common multiple between the base-band sampling frequency and the composite sample frequency divided by the base-band sampling frequency. Also, the filter decimation rate is defined as the filter interpolation rate times the base-band sample frequency and divided by the composite sampling frequency. Finally, the modulator includes a commutator that fractionally samples the plural filter signals at a rate defined by the ratio of the frequency spacing and a greatest common divisor between the composite sampling rate and the frequency spacing.

In a refinement of the foregoing modulator, the commutator fractional sampling ratio is defined by the decimation rate. In a further refinement, the modulator further adds a wireless modulator that mixes the composite signal with a wireless carrier for use in wireless transmission. In a further refinement, the transform, the filter, and the commutator are implemented with executable software on a processor. In a further refinement, the processor is a digital signal processor.

The present invention also teaches a demodulator that receives a composite signal that is a combination of plural sub-channel signals and that is sampled at a composite sampling frequency, and, that discriminates the plural sub-channel signals each at a base-band sampling frequency and separated by a frequency spacing. The demodulator includes a commutator that fractionally distributes the composite signal into plural filter input signals at a rate defined by the ratio of the frequency spacing and a greatest common denominator between the composite sampling rate and the frequency spacing. The demodulator also includes a multiple channel polyphase filter that has plural filter inputs to receive the plural filter input signals. The filter outputs plural filter signals to a discrete Fourier transform. The transformtransforms the plural filter signals, and outputs the plural sub-channel signals.

In a refinement to the foregoing demodulator, the commutator fractional sampling ratio is the decimation rate. In a further refinement, a wireless demodulator is added that is used to receive a wireless carrier signal, and to discriminate the composite signal therefrom to enable wireless reception. In a further refinement, the commutator, the filter, and the transform are implemented with executable software on a processor. In a further refinement, the processor is a digital signal processor.

The present invention also teaches another demodulator that receives a composite signal that is a combination of plural sub-channel signals, and that is sampled at a composite sampling frequency, and, that discriminates the plural sub-channel signals, each sampled at a base-band sampling frequency and separated by a frequency spacing. The demodulator includes a commutator that fractionally distributes the composite signal to plural filter input signals at a rate defined by the ratio of the frequency spacing and a greatest common denominator between the composite sampling rate and the frequency spacing. The demodulator also includes a multiple channel polyphase filter that receives the plural filter input signals and outputs plural filter signals. The filter has a decimation rate defined by a least common multiple between the base-band sampling frequency and the composite sample frequency divided by the base-band sampling frequency, and the filter has a interpolation rate defined as the filter interpolation rate times the base-band sample frequency and divided by the composite sampling frequency. The demodulator also includes a discrete Fourier transform that receives and transform the plural filter signals, and outputs the plural of sub-channel signals. The transform resolution is defined by the ratio of the composite sampling frequency and the greatest common denominator between the composite sampling frequency and the frequency spacing. Also, the transform decimation rate is defined by the ratio of the frequency spacing and a greatest common denominator between the composite sampling frequency and the frequency spacing.

In a refinement to the foregoing demodulator, the commutator fractional sampling ratio is a ratio of integers that define any arbitrary rational number. In a further refinement, a wireless demodulator is added that is used to receive a wireless carrier signal, and to discriminate the composite signal therefrom to enable wireless reception. In a further refinement, the commutator, the filter, and the transform are implemented with executable software on a processor. In a further refinement, the processor is a digital signal processor.

The present invention also teaches a method of modulating plural sub-channel signals that are sampled at a base-band sampling frequency and separated by a frequency spacing, onto a composite signal that is sampled at a composite sampling frequency. This method includes the steps of converting the plural sub-channel signals into plural time domain signals by performing an inverse Fourier transform that has a resolution defined by the ratio of the composite sampling frequency and the greatest common divisor between the composite sampling frequency and the frequency spacing. Also, the transform has a decimation rate defined by the ratio of the frequency spacing and a greatest common divisor between the composite sampling frequency and the frequency spacing. The next step is filtering the plural time domain signals using a multiple channel polyphase filter to produce plural filter signals. The filter has an interpolation rate defined by a least common multiple between the base-band sampling frequency and the composite sample frequency divided by the base-band sampling frequency. Also, the filter decimation rate defined as the filter interpolation rate times the base-band sample frequency and divided by the composite sampling frequency. The last step is fractionally sampling the plural filter signals at a rate defined by the ratio of the frequency spacing and a greatest common divisor between the composite sampling rate and the frequency spacing.

There is also taught a corresponding method of demodulating a composite signal that is sampled at a composite sampling frequency into a plurality of sub-channel signals each sampled at a base-band sampling frequency and separated by a frequency spacing. This method includes the steps of fractionally distributing the composite signal to plural filter input signals at a rate defined by the ratio of the frequency spacing and a greatest common denominator between the composite sampling rate and the frequency spacing. Next, filtering the plurality of filter input signals using a multiple channel polyphase filter to produce plural filter signals. The filter has an decimation rate defined by a least common multiple between the base-band sampling frequency and the composite sample frequency divided by the base-band sampling frequency, and the filter has interpolation rate defined as the filter interpolation rate times the base-band sample frequency and divided by the composite sampling frequency. The next step is transforming the plural filter signals, using a discrete Fourier transform, into the plural sub-channel signals. The transform resolution is defined by the ratio of the composite sampling frequency and the greatest common denominator between the composite sampling frequency and the frequency spacing. Also, the transform decimation rate is defined by the ratio of the frequency spacing and a greatest common denominator between the composite sampling frequency and the frequency spacing.

DESCRIPTION OF THE INVENTION

Illustrative embodiments and exemplary applications will now be described with reference to the accompanying drawings to disclose the advantageous teachings of the present invention. While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
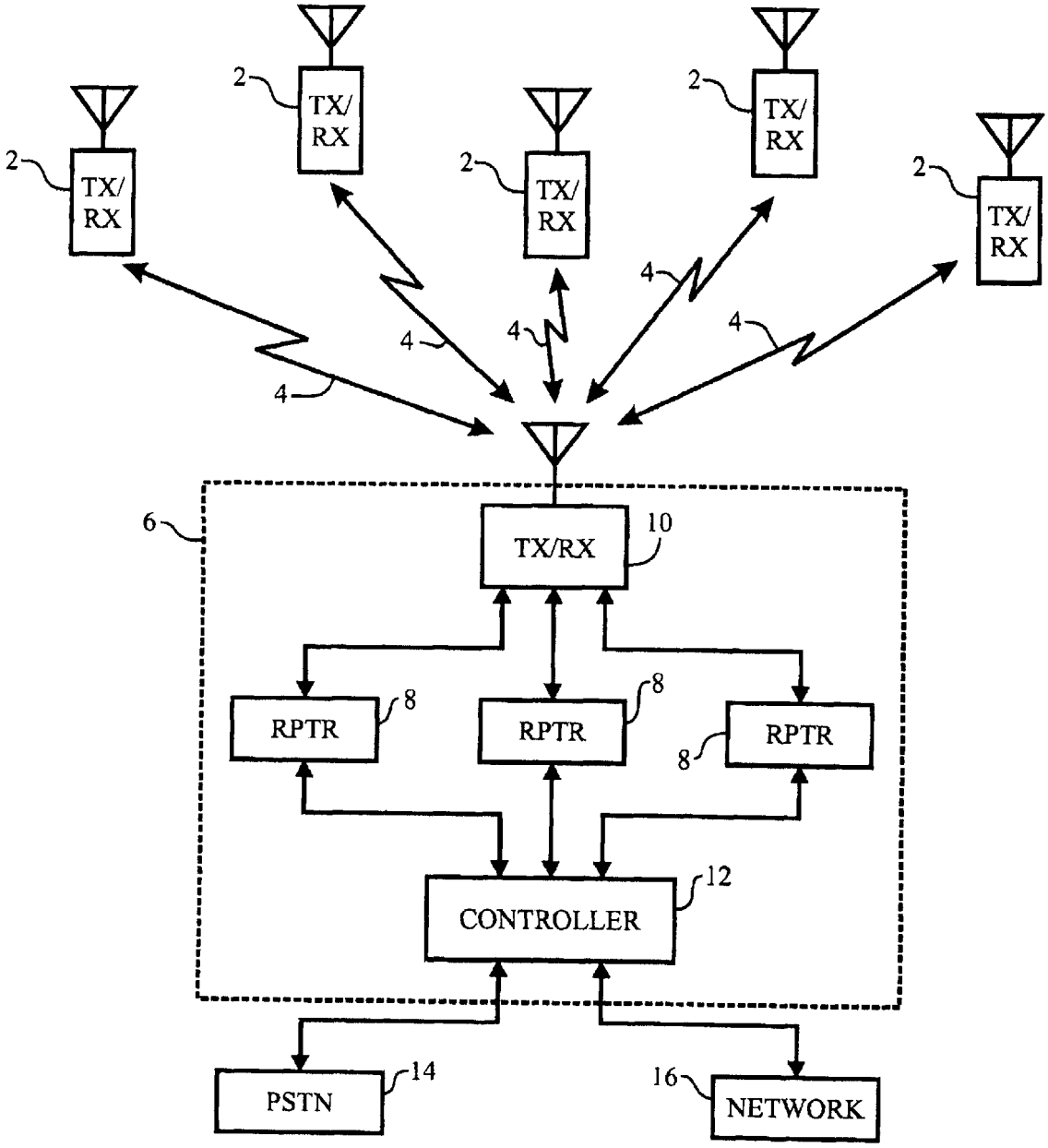
FIG. 1 is a functional block diagram of a wireless communications system according to an illustrative embodiment of the present invention.

An illustrative embodiment communications systems according to the present invention is illustrated in FIG. 1. A plurality of terminal radio units 2 communicate through radio signals 4 with a radio repeater system 6. The radio terminal units comprise a transceiver circuit, controller, and user interface (not shown). The radio repeater system 6 comprises a plurality of radio repeaters 8 that operate on discrete frequency allocations. Each radio repeater 6 comprises a transceiver. The transmitted and received radio signals 4 are combined and coupled to one or more radiating structures with radio frequency combining circuits 10. The operation of the radio repeater system is generally controlled by controller 12, a computing device, the general function of which is understood by those of ordinary skill in the art. The controller 12 also comprises communications circuits. External networks, such as the public switched telephone network ("PSTN") 14 and public or private data networks 16, are interfaced to the controller 12, which is operable to switch communications signals between the repeaters 8 and between the repeaters 8 and the PSTN 14 and networks 16.

More particularly, the illustrative embodiment in FIG. 1 is implemented in a trunked land mobile radio system that employs FDM channelization of the allocated radio spectrum and TDMA access via packetized data for channel trunking management, system control, data communications, and voice communications within each of the FDM sub-channels. Such systems are deployed in the 800 MHz SMR band, the 900 MHz band, and certain other VHF and UHF bands. However, such techniques are equally applicable in any reasonable frequency band, as are those of the present invention. The controller 12 may be any of a variety of computers, processors, microprocessor, or other suitable digital controlling devices as are understood by those of ordinary skill in the art. In FIG. 1, three repeaters 8 are shown, however, those skilled in the art will appreciate that the number of repeaters is dependent upon the radio spectrum allocated to the system and may range from one to twenty, or more. The controller 12 provides various kinds of control of the resources within the repeater systems 6, including interconnecting radio and wireline communications resources, generating and interpreting communication protocols, encoding and decoding voice and data, and other control functions.

In an illustrative embodiment, the channel allocations are 25 kHz wide, and the aforementioned FDM channelization sub-divides each 25 kHz channel into four sub-channels, which are spaced 4.8 kHz apart. The TDMA channelization further divides each sub-band into two communications time slots with multiplexed data packets that are arranged in time to accomplish simplex, half-duplex, and duplex communications in real time. The illustrative embodiment system operates through the transmission and reception of four bit symbols at a 4 kHz symbol rate. The symbols are modulated and demodulated to the RF band according to a 16-QAM modulation scheme with a 16-point constellation in phase and amplitude, as is understood by those of ordinary skill in the art. The present invention teaches novel approaches to the base-band modulation and demodulation of such multiple sub-channelized systems.

Figure 2:
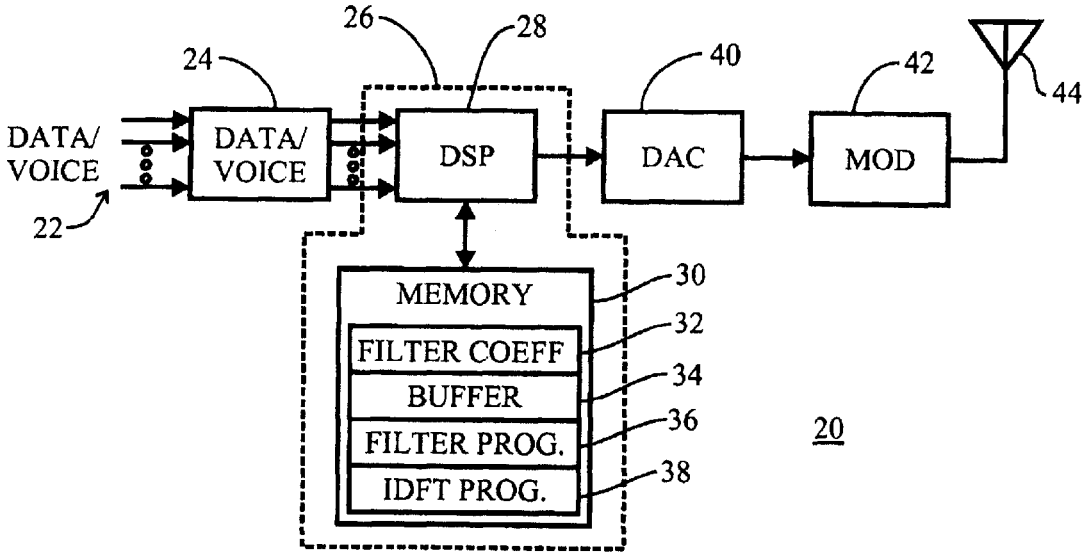
FIG. 2 is a functional block diagram of a radio transmitter according to an illustrative embodiment of the present invention.

FIG. 2 is a functional block diagram of a radio transmitter 20 according to an illustrative embodiment of the present invention. A plurality of data signals 22, which may be arranged as a plurality of data channels, are coupled to a data/voice conditioning circuit 24. The data voice conditioning circuit may employ any of a variety of error correction, interleaving, or other coding techniques that may be applicable to the communications objective of the systems. Such signal conditioning circuitry is understood by those having ordinary skill in the art. The voice data conditioning circuit 24 is operative to generate 'M' base-band signals 25 corresponding to 'M' sub-channels, that are sampled at a first base-band sampling rate. 'M' is an integer value that is greater than one. In one illustrative embodiment, 'M' is equal to four. The data/voice conditioning circuit 24 is coupled to a processing system 26, which is a modulation engine, for accepting and processing the 'M' base-band signals. The processing system 26 comprises a conventional digital signal processor ("DSP") 28 and a conventional memory 30 including RAM for providing an input buffer 34, and ROM for storing pre-programmed parameters and software, such as filter coefficients 32, a multiple channel polyphase filter program 36, and an inverse discrete Fourier transform ("IDFT") program 38. Processed communication signals, in the form of frequency multiplexed composite signals, are output from the processing system 26 to a digital to analog converter ("DAC") 40, which converts the digital base-band signals to analog base-band signals. The analog signals output from the DAC 40 are coupled to an RF modulator 42, for modulating a wireless carrier with a frequency-multiplexed composite signal, which is an RF signal, having 'M' sub-channels. The signals are then radiated by antenna 44 for radio electromagnetic coupling via radio waves to one or more receivers. The DSP 28, memory 30, and DAC 40 can be any of the variety of such devices known to be suitable for telecommunications applications by those or ordinary skill in the art, or that may later become known. Operation of the processing system 20 in accordance with the present invention will be described further herein after.

Figure 3:
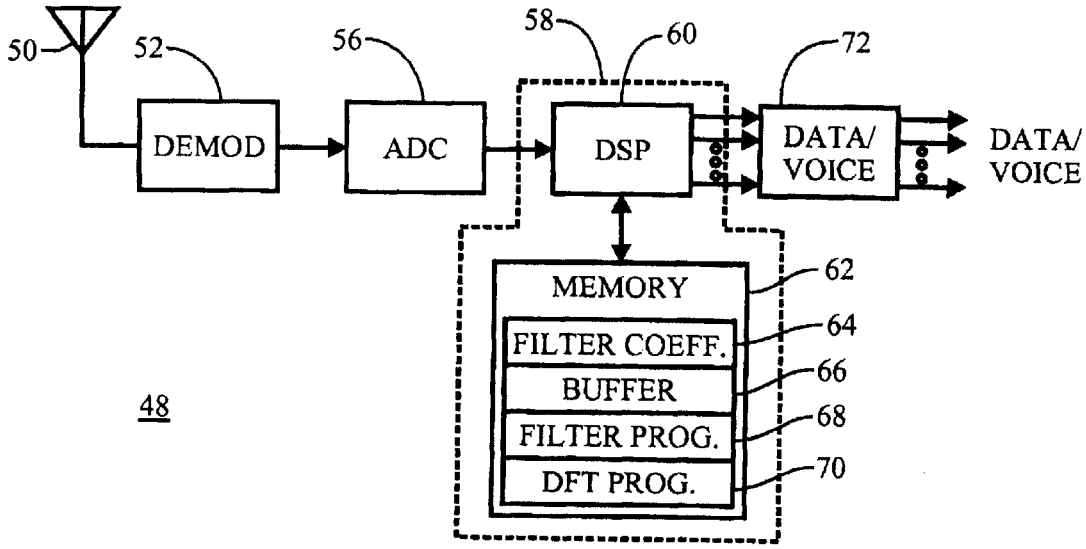
FIG. 3 is a functional block diagram of a radio receiver according to an illustrative embodiment of the present invention.

An exemplary receiver 48 in an illustrative embodiment of the present invention appears as a functional block diagram in FIG. 3. The receiver 48 is operable to demodulate a plurality of 'M' sub-channels that are received from the transmitter 20. The receiver 48 comprises an antenna 50 for intercepting radio signals. The antenna 50 is coupled to a conventional receiver front end RF demodulator 52 for receiving the radio signals and converting them to base-band analog signals. The RF demodulator 52 output produces a composite signal that is coupled to analog to digital converter ("ADC") 56. ADC 56 is operable to convert the analog signals into base-band digital signals, having the 'M' sub-channels of information, into a composite signal having a sampling rate and derived from the 'M' sub-channels. The ADC 56 is coupled to a processing system 58 for processing the signals and for controlling the receiver 48. The processing system 58 comprises a conventional digital signal processor (DSP) 60 and a conventional memory 62. The DSP 60, memory 62, and ADC 56 can be any of the variety of such devices known to be suitable for telecommunications applications by those or ordinary skill in the art. The memory 62 comprises software elements including executable code and variables storage for programming the processing system 58 in accordance with the present invention. The memory 62 includes filter coefficients 64 describing a filter impulse response in accordance with the present invention, as are understood by those of ordinary skill in the art. In addition, the memory 62 includes an input buffer 66 used for storing input data samples. The memory 62 further comprises a multiple channel polyphase filter program 68 and a discrete Fourier transform ("DFT") program 70, in accordance with the present invention. Operation of the processing system 58 in accordance with the present invention will be described further herein after.

In several of the following illustrative examples, a multiple sub-carrier modulation system, developed by ComSpace Corporation and known in the marketplace by the "DCMA" trademark, is used to exemplify the prior art and the advantageous teaching of the present invention. The DCMA systems modulation approach transmits and receives a single or multiple sub-carriers within a FCC allocated radio channels that are spaced at 25 kHz centers. Such channel allocations exist in the United States in the 800 MHz and 900 MHz bands. However, the present invention is in no way limited by these examples, and, those of ordinary skill in the art will appreciate that the teachings herein are applicable to a vast array of communications systems and encompass a vast range of communications bandwidths. The exemplary DCMA systems modulates each sub-channel with a frequency offset that takes on one of four possible values with respect to the FCC allocated channel center frequency, and these values are; −7200 Hz, −2400 Hz, +2400 Hz, and +7200 Hz. Modulations is by 16-QAM comprised of 4-bit symbols transmitted at a symbol rate of 4000 baud. According to the aforementioned frequency offsets, the sub-carrier channel spacing is 4800 Hz. The output sampling rate of the combined sub-carriers ultimately transmitted over the allocated channel is 260 kilo samples per second ("ksps").

Figure 4:
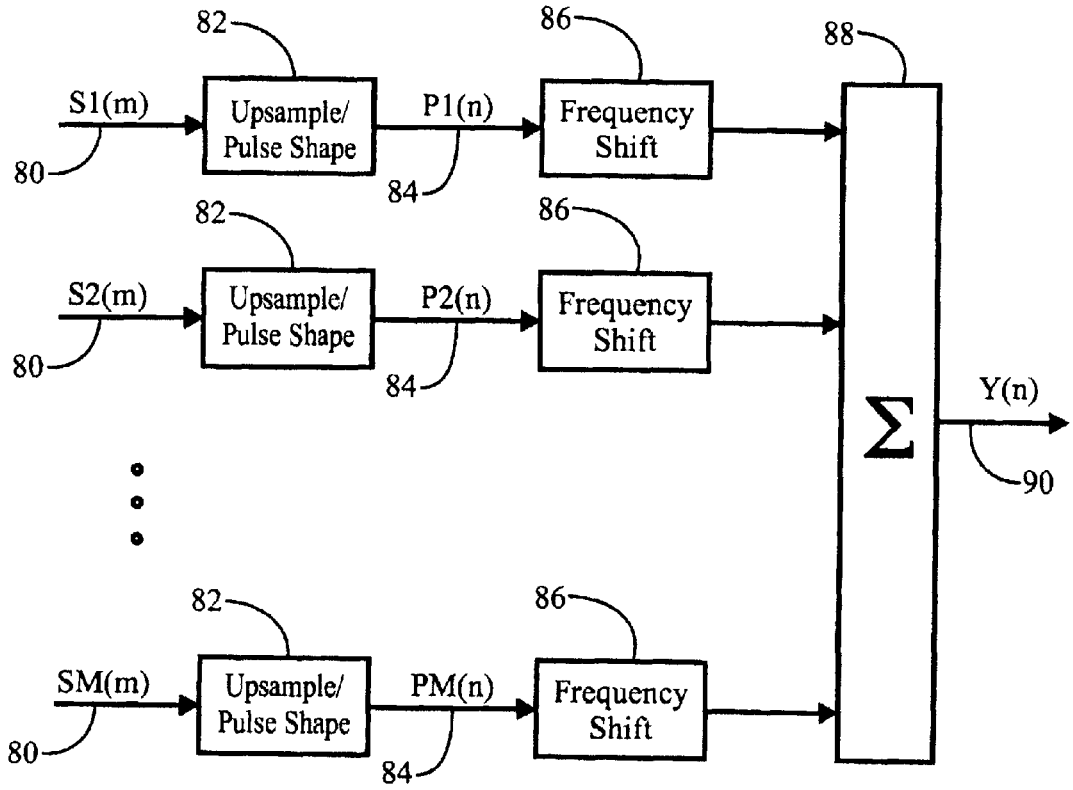
Fig. 4 Prior Art
FIG. 4 is an architectural diagram of a prior art modulation engine.

Reference is directed to FIG. 4, which is an architectural diagram of the prior art modulation engine as used in the DCMA modulation scheme. A plurality of 'M' sub-channel signals SM(m) 80 are input to upsample and pulse shaping filters 82. The filters 82 are digitally implemented finite impulse response ("FIR") filters in one embodiment and output time domain signal PM(n) 84 to frequency shifting circuits 86 that shift the base-band signals according to the aforementioned frequency offsets. The frequency shifted signals are summed be a summation function 88 and the combined output signal y(n) 90 is coupled to RF transmitting circuitry (not shown).

Mathematically, these operations can be expressed as follows.

$$p_l(n) = \sum_{m=-\infty}^{\infty} h(nD - mI)s_l(m) \tag{1}$$

Where D is the polyphase filter decimation rate, I is the polyphase filter interpolation rate, m is the input signal time at the input signal sampling rate, and n is the output time at the upsampled output rate. And, $s_l(m)$ characterizes one symbol of input as a function of time.

Given that the upsample rate, establishes a modulo ratio, the expression becomes:

$$p_l(n) = \sum_{m=-\infty}^{\infty} h\left(I\left(\left\lfloor \frac{nD}{I} \right\rfloor - m\right) + nD \bmod I\right) s_l(m) \tag{2}$$

And since any realizable digital filter must be truncated in time, the summation is limited to the number of taps per phase of the filter, the expression becomes:

$$p_l(n) = \sum_{m=0}^{N_{taps/phase}-1} h(Im + nD \bmod I) s_l\left(\left\lfloor \frac{nD}{I} \right\rfloor - m\right) \tag{3}$$

Adding the frequency shift and summing the plural singles, the output y(n) 90 becomes:

$$y(n) = \sum_{l=1}^{M} p_l(n) e^{j2\pi n l f_\Delta T_s} \tag{4}$$

One of the advantages of the present invention is the reduction in processor operation required to achieve the desired modulation and demodulation of the plural sub-channels. Respecting the prior art modulation engine of FIG. 1, the number of processor multiplication operations (a reasonable indication of processor demand) required to implement the modulation engine is as follows.

$$N_{mult} = (2*M*N_{taps/phase} + M(4+p)) f_{so} \tag{5}$$

Where p is the equivalent number of multiplies required in order to generate the complex sinusoid, and $f_{so}$ is the final sampling rate. Given the parameters of the DCMA system, the number of multiplies in the modulation engine of the repeater is:

$$N_{mult} = (2*4*16+4*(4+p))260000 = (37.44+1.04p) \text{ MMPS} \tag{6}$$

Figure 5:
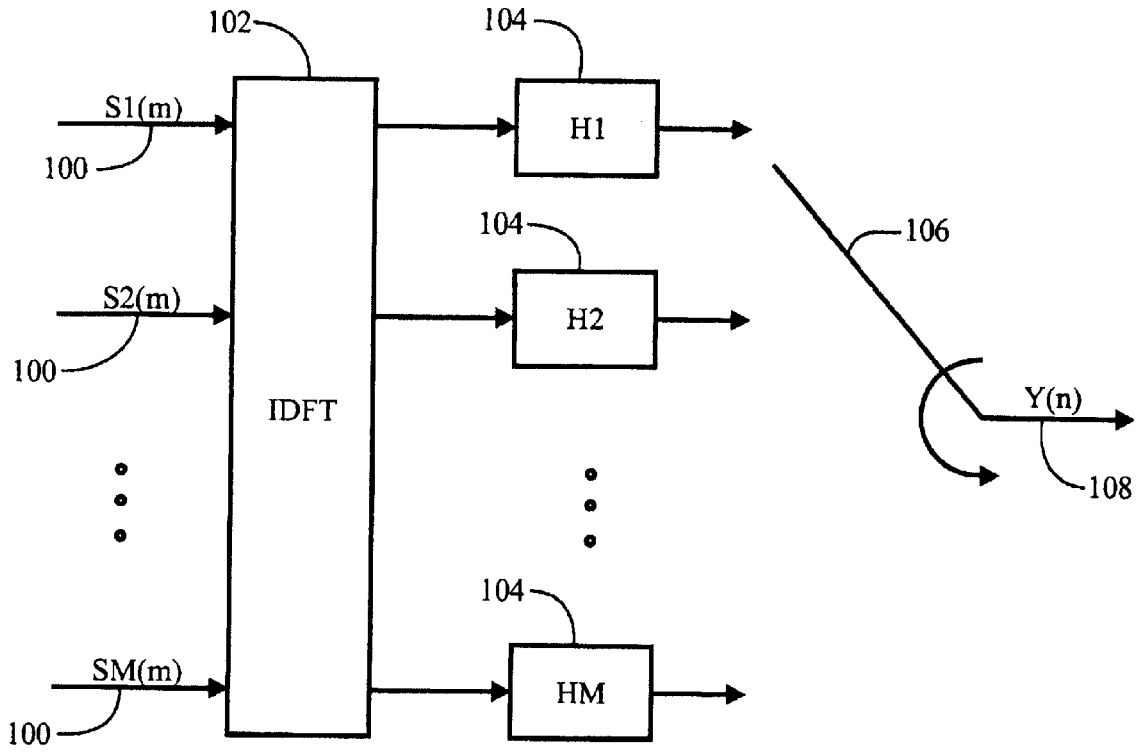
FIG. 5 is an architectural diagram of a modulation engine according to an illustrative embodiment of the present invention.

FIG. 5 is an architectural diagram of a modulation engine according to an illustrative embodiment of the present invention. The input signals SM(m) 100 are coupled to an inverse discrete Fourier transform ("IDFT") 102. The output bins of the IDFT are coupled to a multiple channel polyphase filter 104. The outputs of the filter 104 are combined by a commutator 106 to yield the combined signal output y(n) 108. While the architecture in FIG. 5 differs from the prior art architecture described with respect to FIG. 4, the function of the modulation engine in FIG. 5, in the general case, is mathematically the same. The structure in FIG. 5 can be mathematically described, and the present invention further derived as follows. Consider a composite expression for the modulation engine, which combines Equations (1) and (4).

$$y(n) = \sum_{l=1}^{M} \sum_{m=-\infty}^{\infty} h(nD - mI) s_l(m) e^{j2\pi n l f_\Delta T_s} \tag{7}$$

Which is algebraically manipulated to yield Equation 8.

$$y(n) = \sum_{m=-\infty}^{\infty} h(nD - mI) \sum_{l=1}^{M} s_l(m) e^{j2\pi n l f_\Delta T_s} \tag{8}$$

Use the substitution, n=r+sM, where r is an indicator of the commutator cycle position in time, and s is an indicator of overall time, to yield a modified summation.

$$y(n) = y(r + sM) = \sum_{m=-\infty}^{\infty} h(nD - mI) \sum_{l=1}^{M} s_l(m) e^{j2\pi (r+sM) l f_\Delta T_s} \tag{9}$$

Equation 9 will be readily understood by those possessing ordinary skill in the art. An important advancement in the art made by the present invention occurs when the constraint that $f_\Delta T_s$ is equal to k/M, which equates $f_\Delta T_s$. to a ratio of integers, otherwise stated as a rational number. It is not required in general, but for illustration purposes, k is set to 1 and Equation (9) rewritten as:

$$\begin{aligned} y(n) &= \sum_{m=-\infty}^{\infty} h(nD - mI) \sum_{l=1}^{M} s_l(m) e^{j2\pi (r+sM) l/M} \\ &= \sum_{m=-\infty}^{\infty} h(nD - mI) \sum_{l=1}^{M} s_l(m) e^{j2\pi r l/M} \end{aligned} \tag{10}$$

Which is algebraically manipulated in the same fashion as between Equations (1) and (2) to yield:

$$\begin{aligned} y(n) &= \sum_{m=-\infty}^{\infty} h(nD - mI) s_r(m) \\ &= \sum_{m=0}^{N_{taps/phase}-1} h(Im + nD \bmod I) s_r\left(\left\lfloor \frac{nD}{I} \right\rfloor - m\right) \end{aligned} \tag{11}$$

The commutator position $s_r(m)$ is interpreted as the rth IDFT output bin at time, m. In Equation (10), the sM term in the phasor repeats every $2\pi$ radians and thus drops out of the equation. This filtering operation has the same number of processor multiplies as a single sub-channel rate change. The added processing cost for computing the multiple sub-carrier modulation bank is the cost of computing the IDFT, which performs the mixing operation. However, the IDFT is computed at the symbol rate and not the output sampling rate, and is therefore substantially less processor intensive. This demonstrates that the illustrative embodiment or the present invention not only achieves the desirable decoupling of the input frequency spacing from the filter parameters (decimation rate, interpolation rate, and number of phases) but, does so at a substantially reduced processor load.

Now, considering the forgoing advancement in view of the illustrative embodiment DCMA system, which operation parameters were enumerated herein before, it will be appreciated that the foregoing modulation model can be applied to the modulation bank for the downlink. The downlink is the communications path from the repeater systems to the terminal units. As the repeater systems must communicate simultaneously with a plurality of terminal units, it must do so on each of the sub-channels simultaneously as well. However, since the output sampling rate in DCMA is fixed at 260 ksps, it is necessary to contemplate the more complex sampling rate change this implies (4 ksps to 260 ksps). Consider, generally, a process where the DFT is greatly over sampled in order to accommodate a difficult rate change. Such an operation can be mathematically constructed as follows.

$$y(n) = \sum_{m=-\infty}^{\infty} h(nD - mI) \sum_{l=1}^{M} s_l(m) e^{j2\pi(r+sM)lf_\Delta T_s} \tag{12}$$

The first summation generally defining the filtering operation and the second generally defining the transformation. Again applying an advancement of the present invention, let $f_\Delta T_s$ be a rational number, a/b. Note that at this point in the design process, it is unknown how to select the IDFT resolution, M. Using this substitution, Equation (12) becomes:

$$y(n) = \sum_{m=-\infty}^{\infty} h(nD - mI) \sum_{l=1}^{M} s_l(m) e^{j2\pi(r+sM)la/b} \tag{13}$$

Since $f_\Delta T_s$ equals a/b and this is k/M, then b equals aM/k, and k equals 1, so b=aM, therefore Equation (13) becomes:

$$y(n) = \sum_{m=-\infty}^{\infty} h(nD - mI) \sum_{l=1}^{M} s_l(m) e^{j2\pi rla/M} \tag{14}$$

Again, applying the same practical application of a finite time filter, Equation (14) becomes:

$$y(n) = \sum_{m=0}^{N_{tapsNyq}-1} h(mI + nDmodI) \sum_{l=1}^{M} s_l\left(\left\lfloor \frac{nD}{I} \right\rfloor - m\right) e^{j2\pi la/M} \tag{15}$$

Where $N_{tapsNyq}$ is the number of taps per phase of the Nyquist filter, which is the filter chosen for use in the DCMA implementation of the present invention. The inner summation is the sub-sampled IDFT. A key difference between this equation and the previous equation is that the filter bank output is fractionally sampled. This is an important advancement over the prior art. With this advancement, the baud rate can be related to the frequency by any rational number, and the output sampling frequency can be related to the frequency spacing by any rational number. This mathematical construct is very useful for any modulation engine or software radio. Some of the tradeoffs involved with such a structure do exist. The resolution of the IDFT is given by the output sampling rate divided by the greatest common denominator of the output sampling frequency and the sub-channel frequency spacing. The decimation rate on the output commutator is given by the sub-channel frequency spacing divided by the greatest common divisor of the output sampling frequency and the sub-channel frequency spacing. However, this advancement allows the designer of a communications system great flexibility in selecting the input sampling rate, the sub-channel frequency spacing, and the output sampling rate to suit system requirements. The variable factors which are adjusted to achieve this result are the number of terms of the IDFT, (the order of the IDFT), and the relationship between phase of the filter, (the sequence in which the phases are utilized).

Respecting the question of processor overhead burden of the DCMA illustrative embodiment of the present invention, in the worst case, the computational complexity of using this filter bank is as follows.

$$N_{mult} = 2*N_{taps/phase} f_{so} + C_{DFT} f_b \tag{16}$$

Where CDFT is the number of processor multiplies required in order to compute the IDFT.

Again, for the DCMA illustrative embodiment, the following is an approximation of the complexity numbers.

$$N_{mult} = 2*16*260000 + C_{DFT}*4000 = 8.32 + 0.004 C_{DFT} \text{MMPS} \tag{17}$$

The question of how many processor multiplies will it take to implement the corresponding DFT. In this case there are far fewer inputs than total output points to be computed. Assuming the input is complex, the number of computations becomes:

$$N_{mult} = 8.32 + 0.004(4*N_{sc}*N_{DFT}) \text{MMPS} \tag{18}$$

It is important to note in this case that the number of operations required for the mixing operation can be increased above the required amount for the prior art implementation. This situation can arise if the number of sub-carriers is much smaller than the DFT size. However, in such situations, the utilized bandwidth in ratio to the output sampling rate will be small. If that is the case, the modulation bank can be implemented at a lower output sampling rate followed by an upsampler. The computational complexity of such an implementation in this case is as follows.

$$N_{mult} = 2*15*52000 + 4*4*65*4000 + N_{tap}*260000 = 5.82 + 0.26*N_{tap} \tag{19}$$

Where $N_{tap}$ is the number of taps per phase to implement an up by 5 rate change. This second filter could be readily implemented in 40 taps per phase. This yields a final complexity of 16.22 MIPS, a savings of 20 MIPS over the prior art implementation.

Respecting an implementation of the present invention modulation engine illustrated in FIG. 5 to the DCMA illustrative embodiment, there are four input sub-channel sub-carriers SM(m) 100, each of which is sampled at 4 ksps. A total a 65 IDFT 102 bins coupled to 65 Nyquist filter phases 104. The filter 104 interpolation rate is 65 and the commutator 106 rate is 65 ksps. An upsample of the commutator output by 5 brings the final output sample, y(n), 108 to 260 ksps. The filtering and commutation operation of this bank can be completely defined for all time in terms of three parameters, the filter phase, the data pointer position, and the commutator position. In the case of a DCMA illustrative embodiment 4 ksps baud system with frequency spacing of 4800 Hz and an output sampling rate of 52 ksps, these parameters are defined as follows.

$$\phi(n) = n \bmod 65 \tag{20}$$

The taps of the filter phase, are generated as follows.

$$h_\phi = h(\phi + 65k),\ k = 0 : N_{tapsNyq} - 1 \tag{21}$$

The data pointer position is:

$$\delta(n) = \left\lfloor \frac{n}{65} \right\rfloor \tag{22}$$

The commutator position is given by:

$$x(n)=(6n) \bmod (65) \tag{23}$$

The foregoing equation set does not specify the implementation of the IDFT. The IDFT has four inputs and 65 outputs. There are four active sub-carriers. The sub-carriers should are located at −7200 Hz, −2400 Hz, +2400 Hz and +7200 Hz. In order to accommodate these frequencies, the basic IDFT is modified as follows.

$$s_r(m) = \sum_{l=1}^{4} s_l(m) e^{j2\pi 6r(l-2.5)/65} = e^{-j18\pi r6l/65} \sum_{l=1}^{4} s_l(m) e^{j2\pi r6l/65} \tag{24}$$

This additional shift is not expensive in terms of processor overhead because a direct implementation of the IDFT is used. The composite operation of the filter bank is summarized by the following steps:

STEP 1: Compute the IDFT of one time-slice of symbols according to Equation (24). This will account for 65 separate filter histories, each at the symbol rate, (The original symbols will never be needed again.).

STEP 2: Identify the filter phase according to Equation (20).

STEP 3: Identify the data pointer position according to Equation (22).

STEP 4; Identify the commutator position according to Equation (23).

STEP 5: Compute the dot product of the filter phase and the data vector according to the following equation:

$$y(n) = \sum_{k=0}^{N_{tapsNyq}-1} h(\phi(n) + 65k) \cdot s_{\chi(n)}(\delta(n) - k) \tag{25}$$

This operation is followed by a direct interpolation by 5 to achieve the design output sampling rate of 260 ksps, as discussed above. The interpolation by 5 operation is specified as follows.

$$\phi(n)=n \bmod 5$$

$$\phi(n)=n \bmod 5 \tag{26}$$

The taps of the filter phase are generated as follows.

$$h_\phi=h(\phi+5k),\ k=0:N_{tapsNyq}-1 \tag{27}$$

The data pointer position is:

$$\delta(n) = \left\lfloor \frac{n}{5} \right\rfloor \tag{28}$$

The output is computed as follows:

$$y(n) = \sum_{\lambda=0}^{N_{tapsfill}-1} h(\phi(n) + 5k) \cdot y(\delta(n) - k) \tag{29}$$

The teachings of the present invention are also applicable to the demodulation of multiple sub-carrier signals in a similar fashion to the previously discussed modulation aspects. For a more detailed understanding of the demodulation aspects of the teachings of the present invention, it is useful to consider the prior art, and especially the prior art DCMA systems. By way of review, DCMA modulation consists of a single (in the case of a terminal unit operating on a single sub-channel) or multiple sub-carriers with a frequency offset that takes on four possible values, −7200, −2400, +2400, or +7200 Hz from the allocated carrier frequency. The basic parameters of the system are a symbol rate is 4000 baud; the sub-carrier spacing is 4800 Hz, and an output sampling rate is 260 ksps.

Figure 6:
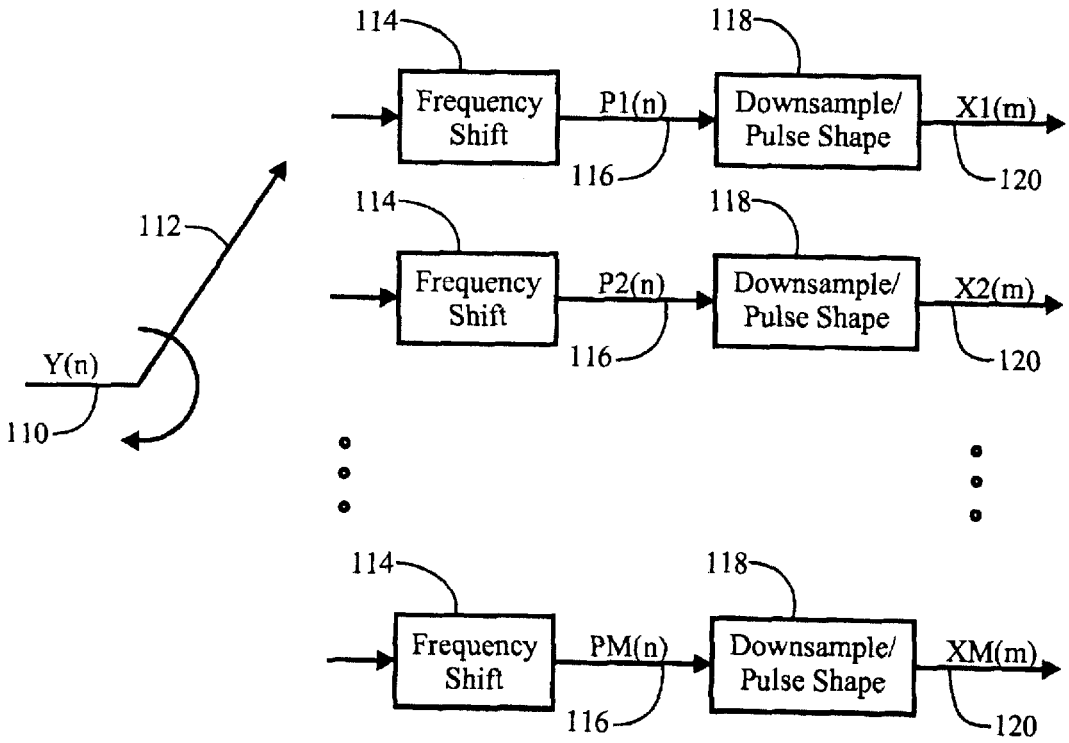
Fig. 6 Prior Art
FIG. 6 is an architectural diagram of a prior art demodulation engine.

The prior art demodulation approach is diagrammed in FIG. 6. A multiple sub-carrier signal Y(n) 110 is received from another circuit, which may be an analog to digital converter further coupled from an RF receiver demodulator. The signal is comprised of a digitally encoded signal at a relatively high sampling rate. A commutator 112 sequences the input signal through a number of positions equal to the number of sub-carriers represented in signal Y(n), thus demultiplexing the received signals into their sub-carrier parts. Each sub-carrier part is frequency shifted by a suitable amount in Frequency Shift circuits 114. The frequency shifted circuits are output from the Frequency Shift circuits 114 as base-band sub-carrier signals PM(n) 116. Each of these signals is sampled at the relatively high input 110 sampling rate. Down sampling to the sub-channel sampling rate and pulse shaping occur at Down Sampler/Pulse Shape circuits 118 for each sub carrier. The base-band signals, at the relatively lower output sampling rate are output at 120 as XM(m). Note that 'n' is a representation of time at the relatively high input sampling rate, and 'm' is a representation of time at the relatively lower output sampling rate. The total number of sub-carriers, or sub-channels is represented by the integer 'M'.

Mathematically, the processes illustrated in FIG. 6 are expressed as follows.

$$x_l(m) = \sum_{n=-\infty}^{\infty} h(mD - nI) y(n) e^{-j2\pi n(f_c + l_\Delta f)T_s} \tag{31}$$

$$x_l(m) = \sum_{s=-\infty}^{\infty} \sum_{r=0}^{M-1} h(mD - (r + sM)I) y (r + sM) e^{-j2\pi(r+sM)(f_c + l_\Delta f)T_s}$$

Where $x_l(m)$ is the output signal for each $l^{th}$ sub-channel, D is the filter decimation rate, I is the filter interpolation rate, y(n) is the multiplexed input signal, $f_c$ is the carrier center frequency, Δf is the sub-carrier offset frequency, and Ts is the sample time period. Then, using the substitution, n=r+sM, as was applied in novel aspects of the modulation engine calculations, and the summation for the novel aspects of the illustrative embodiment demodulation engine becomes:

$$x_l(m) = \sum_{s=-\infty}^{\infty} \sum_{r=0}^{M-1} h(mD-(r+sM)I)y(r+sM)e^{-j2\pi(r+sM)(f_c+l\Delta f)T_s} \tag{32}$$

Which is algebraically equivalent to:

$$x_l(m) = \sum_{r=0}^{M-1} e^{-j2\pi r(f_c+l\Delta f)T_s} \sum_{s=-\infty}^{\infty} h(mD-(r+sM)I)y(r+sM) \tag{33}$$

In the flowing analysis, the inner summation, indicating the filter response, is separated out, and, the modulo count remainder of the decimation/interpolation process incorporated for thoroughness.

$$\hat{y}(m) = \sum_{s=-\infty}^{\infty} h\left(MI\left(\left\lfloor \frac{mD-rI}{MI} \right\rfloor - s\right) + (mD-rI)\bmod MI\right)y(r+sM) \tag{34}$$

Using the substitution, $$\tilde{s} = \left\lfloor \frac{mD-rI}{MI} \right\rfloor - s,$$

and terminating the filter response time according to the number of taps employed in the digital filter, the expression becomes:

$$\hat{y}_r(m) = \sum_{\tilde{s}=0}^{\left\lceil \frac{N_{taps}}{MI} \right\rceil - 1} h(MI\tilde{s} + (mD-rI)\bmod MI)\, y\left(r + \left(\left\lfloor \frac{mD-rI}{MI} \right\rfloor - \tilde{s}\right)M\right) \tag{35}$$

The operation of commutation is expressed by, $y_r(s)=y(r+sM)$, and is applied to Equation (35) to yield:

$$\hat{y}_r(m) = \sum_{\tilde{s}=0}^{\left\lceil \frac{N_{taps}}{MI} \right\rceil - 1} h(MI\tilde{s} + (mD-rI)\bmod MI)\, y_r\left(\left\lfloor \frac{mD-rI}{MI} \right\rfloor - \tilde{s}\right) \tag{36}$$

Equation 36 is the form of an ordinary polyphase filtering operation, with the slight modification of the rI term. This can be readily implemented in a digital signal processor, as will be appreciated by those of ordinary skill in the art. Finally, substitution back in to Equation (33) yields the following complete expression of the output channels.

$$x_l(m) = \sum_{r=0}^{M-1} e^{-j2\pi r(f_c+l\Delta f)T_s} \hat{y}_r(m) = e^{-(j2\pi rf)_c T_s} \sum_{r=0}^{M-1} e^{-(j2\pi rl)\Delta f T_s} \hat{y}_r(m) \tag{37}$$

The discrete Fourier transform ("DFT") is not necessarily an ordinary DFT, although it can be in certain cases, depending on the relationship between $\Delta f$ and $T_s$. In general, according to the advantageous teachings of the present invention, the relationship between $\Delta f$ and $T_s$ can be any rational number. In order to accommodate this possibility, the input to the DFT may have to be decimated. The processing structure employed to achieve the decimation, as well as the filter and transform according to an illustrative embodiment of the present invention is depicted in FIG. 7.

Figure 7:
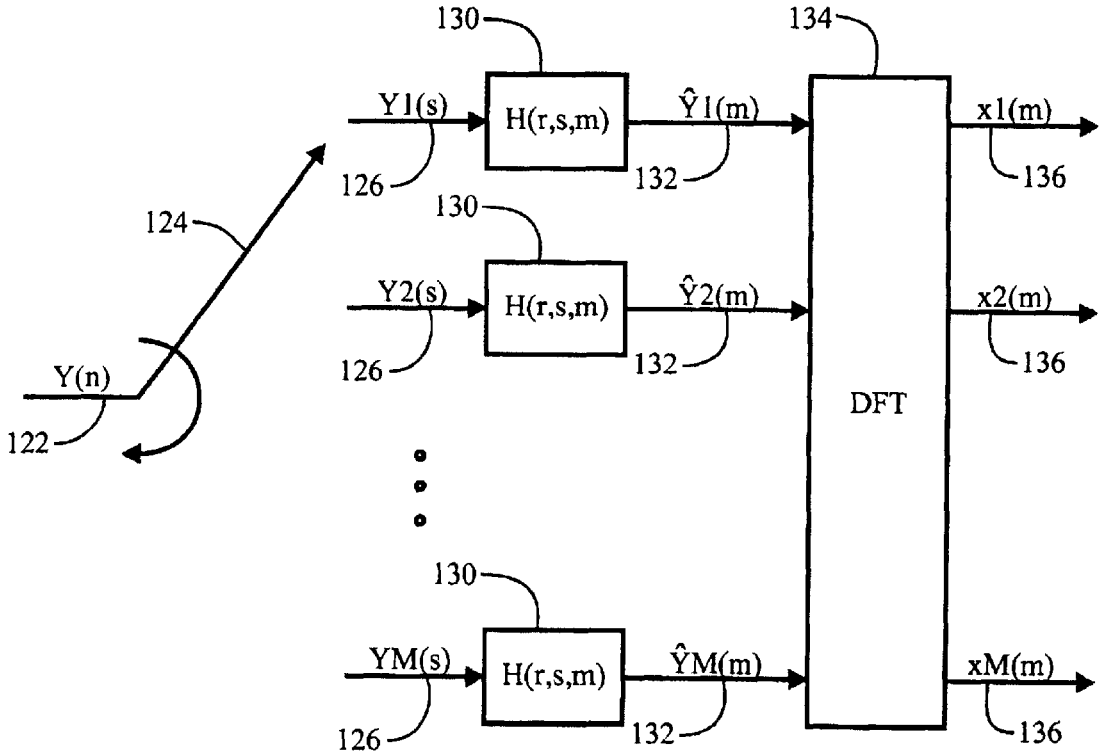
FIG. 7 is an architectural diagram of a demodulation engine according to an illustrative embodiment of the present invention.

FIG. 7 is an architectural diagram of a demodulation engine according to an illustrative embodiment of the present invention. The composite multi-sub-carrier signal Y(n) 122 is input to a commutator 124, which commutes the signal 122 to the plurality of filter input signals 126. The filters 130 pulse shape the signals to $\hat{Y}M(r,s,m)$ filter signals 132 which are input to discrete Fourier transform ("DFT") 134. The 'M' individual outputs xM(m) 136 are output from DFT 134, and are used for subsequent signal processing and utilization, as is understood by those skilled in the art.

Respecting the illustrative embodiment DCMA communications system, the input sampling rate is 260 ksps with 4 sub-carriers spaced at 4800 Hz having a baud rate of 4 ksps. The calculations yield values as follows; M=325, $f_cT_s=-9/325$, $\Delta fT_s=6/325$, I=1 and D=65. Consequently, the operation of the analysis bank can be expressed as follows.

$$y_r(s)=y(r+s325) \tag{38}$$

$$\hat{y}_r(m) = \sum_{\tilde{s}=0}^{\left\lceil \frac{N_{taps}}{325} \right\rceil - 1} h(325\tilde{s} + (m65-r)\bmod 325)\, y_r\left(\left\lfloor \frac{m65-r}{325} \right\rfloor - \tilde{s}\right) \tag{39}$$

and, $$x_l(m) = e^{jl8\pi r/325} \sum_{r=0}^{324} e^{-j12\pi rl/325} \hat{y}_r(m) = e^{jl8\pi r/325} \sum_{r=0}^{324} e^{-j2\pi l(6r\bmod 325)/325} \hat{y}_r(m) \tag{40}$$

Respecting the processor demand for this illustrative embodiment application of the present invention, the number of processor multiplications required in order to implement such an operation is approximated in the worst case as follows.

$$N_{mult}=(2*N_{taps}+N_{dft})f_b=(2*N_{taps}+4N_{sc})f_b \tag{41}$$

The number of computations required for a 10 sub-carrier system assuming a 11 symbol delay is 11 MIPS. The same system with a conventional implementation would require 70 MIPS. On the receive side at least 3 taps of the filter must be sampled. A fine timing offset (early or late) may be realized by changing the phase of the filter. These additional outputs scale the complexity requirements. For 3 output taps, the complexity requirements triple, which is true of both the prior art implementation and the illustrative embodiment implementation.

Thus, the present invention has been described herein with reference to a particular embodiment for a particular application. It is therefore intended by the appended claims to cover any and all such applications, modifications and embodiments within the scope of the present invention.

Accordingly,

What is claimed is:

1. A modulator for receiving a plurality of sub-channel signals that are sampled at a base-band sampling frequency and separated by a frequency spacing, and, for generating a composite signal, combining the plurality of sub-channel signals, that is sampled at a composite sampling frequency, comprising:

an inverse discrete Fourier transform coupled to receive and transform the plurality of sub-channel signals into a plurality of time domain signals;

a multiple channel polyphase filter coupled to receive said plurality of time domain signals and output a plurality of filter signals, and a commutator operable to fractionally sample said plurality of filter signals at a rate defined by the ratio of said frequency spacing and a greatest common divisor between said composite sampling [rate] *frequency* and said frequency spacing.

2. The modulator in claim 1, and wherein said commutator fractional sampling ratio is [the] *equal to a* decimation rate *of the inverse discrete Fourier transform*.

3. The modulator in claim 1, further comprising a wireless modulator operable to mix the composite signal with a wireless carrier for wireless transmission.

4. The modulator in claim 1, and wherein said transform, said filter, and said commutator are implemented with executable software on a processing means.

5. The modulator in claim 4, and wherein said processing means is a digital signal processor.

6. A modulator for receiving a plurality of sub-channel signals that are sampled at a base-band sampling frequency and separated by a frequency spacing, and, for generating a composite signal, combining the plurality of sub-channel signals, that is sampled at a composite sampling frequency, comprising:

an inverse discrete Fourier transform coupled to receive and transform the plurality of sub-channel signals into a plurality of time domain signals, said inverse discrete Fourier [transform resolution] *transform having a resolution* defined by the ratio of said composite sampling frequency and the greatest common divisor between said composite sampling frequency and said frequency spacing, and, said inverse discrete Fourier transform having a transform decimation rate defined by the ratio of said frequency spacing and a greatest common denominator between said composite sampling frequency and said frequency spacing;

a multiple channel polyphase filter coupled to receive said plurality of time domain signals and output a plurality of filter signals, said filter having an interpolation rate defined by a least common multiple between said base-band sampling frequency and said composite sample frequency divided by said base-band sampling frequency, said multiple channel polyphase filter having a filter decimation rate defined as said filter interpolation rate times said base-band sample frequency and divided by said composite sampling frequency, and a commutator operable to fractionally sample said plurality of filter signals at a rate defined by the ratio of said frequency spacing and a greatest common divisor between said composite sampling [rate] *frequency* and said frequency spacing.

7. The modulator in claim 6, and wherein said commutator sampling rate is said decimation rate.

8. The modulator in claim 6, further comprising a wireless modulator operable to mix the composite signal with a wireless carrier for wireless transmission.

9. The modulator in claim 6, and wherein said transform, said filter, and said commutator are implemented with executable software on a processing means.

10. The modulator in claim 9, and wherein said processing means is a digital signal processor.

11. A method of modulating a plurality of sub-channel signals that are sampled at a base-band sampling frequency and separated by a frequency spacing, onto a composite signal that is sampled at a composite sampling frequency, comprising[the steps of]:

converting the plurality of sub-channel signals into a plurality of time domain signals by performing an inverse Fourier transform that has a resolution defined by the ratio of the composite sampling frequency and a greatest common divisor between the composite sampling frequency and the frequency spacing, and, a decimation rate defined by the ratio of the frequency spacing and a greatest common divisor between the composite sampling frequency and the frequency spacing;

filtering said plurality of time domain signals using a multiple channel polyphase filter to produce a plurality of filter signals, the multiple channel polyphase filter having an interpolation rate defined by a least common multiple between the base-band sampling frequency and the composite sample frequency divided by the base-band sampling frequency, the filter decimation rate defined as the filter interpolation rate times the base-band sample frequency and divided by the composite sampling frequency, and fractionally sampling said plurality of filter signals at a rate defined by the ratio of the frequency spacing and a greatest common divisor between the composite sampling [rate] *frequency* and the frequency spacing.

*12. A system comprising:*

*a modulator to receive a first plurality of sub-channel signals that are sampled at a first base-band sampling frequency and separated by a first frequency spacing, and to generate a first composite signal, combining the first plurality of sub-channel signals, that is sampled at a first composite sampling frequency, comprising:*

*an inverse discrete Fourier transform coupled to receive and transform the first plurality of sub-channel signals into a plurality of time domain signals;*

*a first multiple channel polyphase filter coupled to receive said plurality of time domain signals and output a plurality of first filter signals, and*

*a first commutator operable to fractionally sample said plurality of first filter signals at a rate defined by the ratio of said first frequency spacing and a greatest common divisor between said first composite sampling frequency and said first frequency spacing; and*

*a demodulator to receive a second composite signal that is a combination of a second plurality of sub-channel signals and that is sampled at a second composite sampling frequency, and to discriminate the second plurality of sub-channel signals each at a second base-band sampling frequency and separated by a second frequency spacing, comprising:*

*a second commutator operable to fractionally distribute said second composite signal to a plurality of filter input signals at a rate defined by the ratio of said second frequency spacing and a greatest common denominator between said second composite sampling frequency and said second frequency spacing;*

*a second multiple channel polyphase filter having a plurality of filter inputs coupled to receive said plurality of filter input signals, said filter to output a plurality of second filter signals; and*

*a discrete Fourier transform coupled to receive and transform said plurality of second filter signals and to output the second plurality of sub-channel signals.*

*13. The system of claim 12, wherein said demodulator comprises a wireless demodulator operable to receive a wireless carrier signal and discriminate the second composite signal therefrom for wireless reception.*

*14. The system of claim 12, wherein said second commutator, said second multiple channel polyphase filter, and said discrete Fourier transform are implemented with executable software on a processing means.*

*15. The system of claim 14, wherein said processing means comprises a digital signal processor.*

*16. A method of modulating a plurality of sub-channel signals that are sampled at a base-band sampling frequency and separated by a frequency spacing, and generating a composite signal, combining the plurality of sub-channel signals, that is sampled at a composite sampling frequency, the method comprising:*

*converting the plurality of sub-channel signals into a plurality of time-domain signals using an inverse discrete Fourier transform;*

*filtering the plurality of time-domain signals using a multiple channel polyphase filter, to thereby output a plurality of filter signals; and*

*fractionally sampling said plurality of filter signals at a rate defined by the ratio of said frequency spacing and a greatest common divisor between said composite sampling frequency and said frequency spacing.*

*17. The method of claim 16, wherein said commutator fractional sampling ratio is equal to a decimation rate used in said converting.*

*18. The method of claim 16, further comprising:*

*mixing the composite signal with a wireless carrier for wireless transmission.*

*19. A non-transitory processor-readable medium containing instructions that, when executed by a processor, cause the processor to implement a method of modulating a plurality of sub-channel signals that are sampled at a base-band sampling frequency and separated by a frequency spacing, and generating a composite signal, combining the plurality of sub-channel signals, that is sampled at a composite sampling frequency, the method comprising:*

*converting the plurality of sub-channel signals into a plurality of time-domain signals using an inverse discrete Fourier transform;*

*filtering the plurality of time-domain signals using a multiple channel polyphase filter, to thereby output a plurality of filter signals; and*

*fractionally sampling said plurality of filter signals at a rate defined by the ratio of said frequency spacing and a greatest common divisor between said composite sampling frequency and said frequency spacing.*

*20. The medium of claim 19, wherein said commutator fractional sampling ratio is equal to a decimation rate used in said converting.*

*21. The medium of claim 19, wherein the operations further comprise:*

*mixing the composite signal with a wireless carrier for wireless transmission.*

*22. A method of modulating a first plurality of sub-channel signals that are sampled at a first base-band sampling frequency and separated by a first frequency spacing, and to generate a first composite signal, combining the first plurality of sub-channel signals, that is sampled at a first composite sampling frequency and of demodulating a second composite signal that is a combination of a second plurality of sub-channel signals and that is sampled at a second composite sampling frequency, and to discriminate the second plurality of sub-channel signals each at a second base-band sampling frequency and separated by a second frequency spacing, the method comprising:*

*transforming the first plurality of sub-channel signals by using an inverse discrete Fourier transform, to obtain a plurality of time domain signals;*

*filtering the plurality of time domain signals using a first multiple channel polyphase filter, to output a plurality of first filter signals;*

*fractionally sampling said plurality of first filter signals at a rate defined by the ratio of said first frequency spacing and a greatest common divisor between said first composite sampling frequency and said first frequency spacing;*

*fractionally distributing said second composite signal to a plurality of filter input signals at a rate defined by the ratio of said second frequency spacing and a greatest common denominator between said second composite sampling frequency and said second frequency spacing;*

*filtering the plurality of filter input signals using a second multiple channel polyphase filter to output a plurality of second filter signals; and*

*transforming said plurality of second filter signals using a discrete Fourier transform, to output the second plurality of sub-channel signals.*

*23. The method of claim 22, further comprising:*

*receiving a wireless carrier signal;*

*and discriminating the second composite signal therefrom for wireless reception.*

*24. A non-transitory processor-readable medium containing instructions that, when executed by a processor, cause the processor to implement a method of modulating a first plurality of sub-channel signals that are sampled at a first base-band sampling frequency and separated by a first frequency spacing, and to generate a first composite signal, combining the first plurality of sub-channel signals, that is sampled at a first composite sampling frequency and of demodulating a second composite signal that is a combination of a second plurality of sub-channel signals and that is sampled at a second composite sampling frequency, and to discriminate the second plurality of sub-channel signals each at a second base-band sampling frequency and separated by a second frequency spacing, the method comprising:*

*transforming the first plurality of sub-channel signals by using an inverse discrete Fourier transform, to obtain a plurality of time domain signals;*

*filtering the plurality of time domain signals using a first multiple channel polyphase filter, to output a plurality of first filter signals;*

*fractionally sampling said plurality of first filter signals at a rate defined by the ratio of said first frequency spacing and a greatest common divisor between said first composite sampling frequency and said first frequency spacing;*

*fractionally distributing said second composite signal to a plurality of filter input signals at a rate defined by the ratio of said second frequency spacing and a greatest common denominator between said second composite sampling frequency and said second frequency spacing;*

*filtering the plurality of filter input signals using a second multiple channel polyphase filter to output a plurality of second filter signals; and*

*transforming said plurality of second filter signals using a discrete Fourier transform, to output the second plurality of sub-channel signals.*

*25. The medium of claim 24, wherein the operations further comprise:*

*receiving a wireless carrier signal;*

*and discriminating the second composite signal therefrom for wireless reception.*

* * * * *